US012083599B2

(12) United States Patent
Liu et al.

(10) Patent No.: US 12,083,599 B2
(45) Date of Patent: Sep. 10, 2024

(54) NOZZLE CLEANING IN JETTING OF METAL ALLOYS

(71) Applicant: Additive Technologies LLC, Palm City, FL (US)

(72) Inventors: Chu-Heng Liu, Penfield, NY (US); Scott James Vader, Pittsford, NY (US); Paul J. Mcconville, Webster, NY (US); David A. Mantell, Rochester, NY (US); Christopher T. Chungbin, Webster, NY (US); Peter M Gulvin, Webster, NY (US)

(73) Assignee: Additive Technologies LLC, Palm City, FL (US)

( * ) Notice: Subject to any disclaimer, the term of this patent is extended or adjusted under 35 U.S.C. 154(b) by 491 days.

(21) Appl. No.: 16/844,524

(22) Filed: Apr. 9, 2020

(65) Prior Publication Data

US 2020/0324341 A1 Oct. 15, 2020

Related U.S. Application Data

(60) Provisional application No. 62/832,912, filed on Apr. 12, 2019.

(51) Int. Cl.
*B22F 10/22* (2021.01)
*B22F 3/115* (2006.01)
(Continued)

(52) U.S. Cl.
CPC ............. *B22F 3/115* (2013.01); *B22F 10/22* (2021.01); *B22F 10/50* (2021.01); *B22F 12/53* (2021.01);
(Continued)

(58) Field of Classification Search
CPC ...................................................... B22F 10/22
See application file for complete search history.

(56) References Cited

U.S. PATENT DOCUMENTS 2,357,125 A * 8/1944 Miller ................ B23K 35/3603
148/26
2013/0141491 A1 * 6/2013 Krichtman ........... B41J 2/16552
347/30
(Continued)

FOREIGN PATENT DOCUMENTS

EP 1072331 A1 * 1/2001 ............. B08B 9/087
WO WO-2020198046 A1 * 10/2020 ............. B08B 9/087

OTHER PUBLICATIONS

Espacenet machine translation of EP-1072331-A1 retrieved on May 30, 2022 (Year: 2001).*

*Primary Examiner* — Jophy S. Koshy
*Assistant Examiner* — Joshua S Carpenter
(74) *Attorney, Agent, or Firm* — Maginot Moore & Beck LLP

(57) ABSTRACT

The nozzles of a MHD liquid metal ejector/printhead can be clogged by contaminants in the liquid metal. Typically, these contaminants are in the form of small particles of aggregates of particles, such as metal oxides, that are insoluble in the liquid metal. Possible cleaning methods include mechanically removing the clogging material, such as by using a physical device to dislodge the clogging material and remove it; chemically removing the clogging material, such as by using selected chemicals/flux to chemically react with the clogging material; using ultrasound to break/remove the clogging material; and providing reversed and/or oscillating flow of material through the nozzle.

3 Claims, 12 Drawing Sheets

(51) Int. Cl.
    *B22F 10/50*     (2021.01)
    *B22F 12/53*     (2021.01)
    *B22F 12/90*     (2021.01)
    *B33Y 30/00*     (2015.01)
    *B33Y 70/00*     (2020.01)

(52) U.S. Cl.
    CPC ............... *B22F 12/90* (2021.01); *B33Y 30/00* (2014.12); *B33Y 70/00* (2014.12)

(56) References Cited

U.S. PATENT DOCUMENTS

| | | | | |
|---|---|---|---|---|
| 2014/0217134 A1* | 8/2014 | Rasa | ................. | B05B 5/1608 222/590 |
| 2021/0379664 A1* | 12/2021 | Gibson | ................. | B05B 5/0255 |

* cited by examiner

NOZZLE CLEANING IN JETTING OF METAL ALLOYS

CLAIM OF PRIORITY

The present application claims priority from U.S. Provisional Application Ser. No. 62/832,912, filed Apr. 12, 2019.

TECHNICAL FIELD

The present Disclosure relates to additive manufacturing using metal alloys.

BACKGROUND

U.S. Pat. Nos. 9,616,494 and 10,040,119, incorporated by reference in their entireties for the teachings thereof, describe a magnetohydrodynamic (MHD) printer and process suitable for jetting liquid metal and its alloys. The patents describe an arrangement whereby current placed through a coil produces time-varying magnetic fields that induce eddy currents within a reservoir of liquid metal compositions. Coupling between magnetic and electric fields within the liquid metal results in Lorentz forces that cause ejection of droplets of the liquid metal compositions through a nozzle of controlled size, shape, and orifice. The process and apparatus described in the above-mentioned patents provide certain practical advantages. Wire feed stock may be used, as opposed to metal powder. The nozzles may be incorporated in a multi-nozzle printer architecture.

The nozzles of MHD liquid metal ejector/printhead can be clogged by contaminants in the liquid metal. Typically, these contaminants are in the form of small particles of aggregates of particles that are insoluble in the liquid metal. Quite commonly, they are metal oxides. During normal operations of these liquid metal ejector such as 3D printing or printing conductive traces, etc., these contaminants can accumulate around the nozzle and clog the narrow fluid channel associated with the opening and degrade the jetting performance.

SUMMARY

According to one aspect, there is provided a method of cleaning a nozzle ejecting liquid metal from a chamber through an opening, the method comprising removing contaminants from the opening.

DETAILED DESCRIPTION

Figure 1:
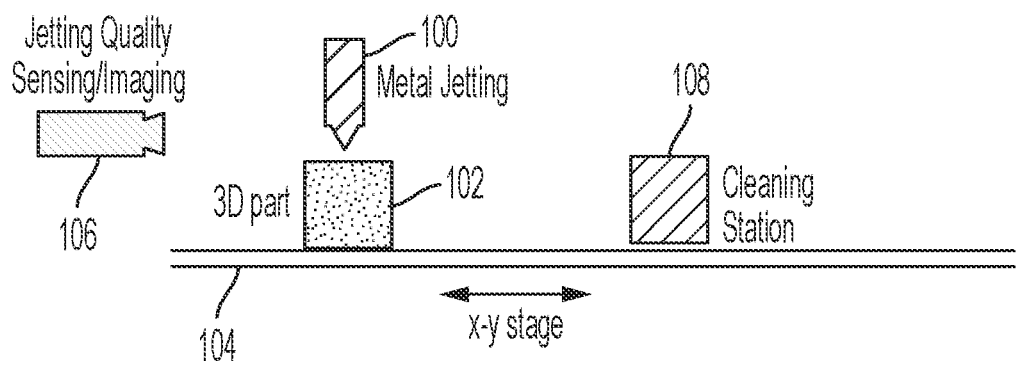
FIG. 1 and FIG. 2 show an overview of a nozzle cleaning process/device to clear the nozzle of the liquid metal ejector.
Figure 2:
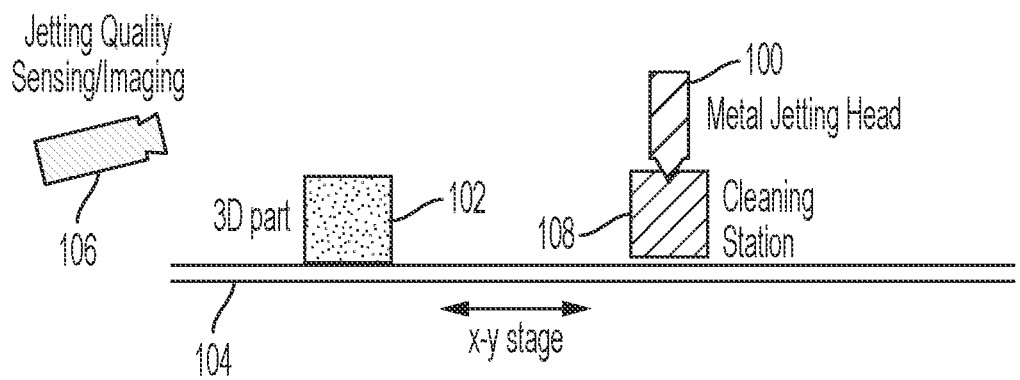

FIG. 1 and FIG. 2 show an overview of a nozzle cleaning process/device to clear the nozzle of the liquid metal ejector. The nozzle 100 includes a body defining a main chamber 200 which leads to an opening 202. In a practical embodiment, there is further associated with nozzle 100 ejecting hardware, such as a coil 204, the operation of one embodiment thereof is described in the patents referenced above. In brief, liquid metal is retained in chamber 200 until activation by hardware such as a coil 204 causes a droplet or stream of the liquid metal to be emitted through opening 202.

As can be seen, a metal-jetting nozzle 100 is used in creating a 3D workpiece such as 102. The workpiece 102 can be placed on a movable platen 104. Such as described in the referenced patents, platen 104 can be used to reciprocate or otherwise move by small amounts the workpiece 102 as the nozzle 100 jets or places molten metal alloy thereon. When the workpiece 102 is deemed finished, the platen 104 can be used to move the workpiece 102 away from the nozzle 100.

Further as shown, there may be provided an imaging module 106 and cleaning station 108. The imaging module 106 is typically directed at the zone where the most recent metal droplets from nozzle 100 land on the workpiece 102. Imaging module 106 may be sensitive to any type of light or emission, such as for thermal imaging. Imaging module 106 may employ stereoscopic optics. Cleaning station 108 can be employed for any type of post-processing on a completed or semi-completed workpiece such as 102. The movable platen 104 can be used to convey the workpiece 102 from the nozzle 100 to the cleaning station 108, and as needed back to the nozzle 100 to continue making of the workpiece. Of course, in a practical embodiment, the relative motion of the workpiece 102 to the nozzle 100 and/or the cleaning station 108 can be provided by motion of nozzle 100 and/or the cleaning station 108 against a largely stationary platen such as 104.

After a certain amount of normal jetting from nozzle 100 in the course of a manufacturing operation, a nozzle cleaning operation is performed before returning to normal jetting. Typical process steps are: 1) perform regular jetting job, such as for 3D printing, or printing electronics; 2) jetting quality sensing or prediction; 3) detect and determine conditions when cleaning is necessary; 4) perform nozzle cleaning to restore jetting performance (such as at a cleaning station, as shown in FIG. 2); and 5) return to the regular jetting job.

Jetting quality degradation due to clogging can be estimated based on the materials properties and printing process parameters. Therefore, an interval (time, number of drops fired, etc.) could be pre-set to pause the regular jetting job and perform a cleaning operation. Alternatively, jetting quality degradation due to clogging can be monitored in different ways, such as: imaging of the nozzle; imaging/detection of satellites (e.g., satellites can be easily observed during the printing of conductive traces); imaging/measurement of jet directionality; imaging/measurement of drop velocities; and/or imaging/monitoring of part quality during a build process. Once the degradation exceeds a certain threshold, a cleaning operation is performed.

The clogged nozzle can be cleaned in a number of different ways. One way comprises purging, or in other words, providing an extra flow of liquid metal through the nozzle. Different purging methods can be used, for example: extra jetting; using external air pressure difference to drive the flow and/or meniscus location, either by pressurizing the supply end and/or applying vacuum to the nozzle end; capillary flow; gravity driven flow; or a combination of these methods.

Another cleaning method comprises mechanically removing the clogging material, such as by using a physical device to dislodge the clogging material and remove it.

Another cleaning method comprises chemically removing the clogging material, such as by using selected chemicals/flux to chemically react with the clogging material.

Another cleaning method comprises using ultrasound to break/remove the clogging material. There can be external ultrasound or internal ultrasound.

Another cleaning method comprises providing reversed flow and/or oscillating flow of a material through the nozzle.

Figure 3:
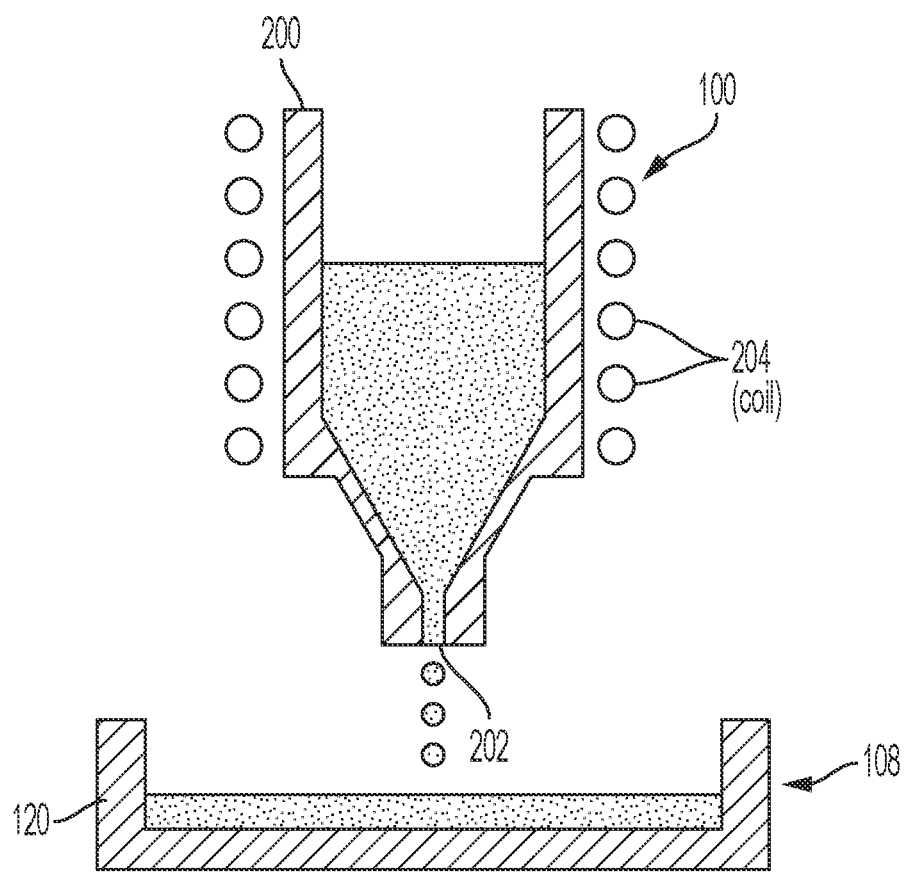
FIGS. 3-6; 7A, 7B, and 8-12 are simplified elevational views illustrating various cleaning techniques for a nozzle.

In extra jetting or purging, or the extra flow of liquid metal through the nozzle, the ejector fires extra drops of liquid metal to clear the clogged nozzle. The waveform of the jetting can be modified to enhance the flow. Pulse amplitude, frequency and other parameters can also be optimized. Back pressure changes can move the meniscus location for this action. The external air pressure difference is used to drive the flow and/or change the meniscus location. Higher back pressures push the meniscus out further from the nozzle. As shown in FIG. 3, extra air pressure can be applied to overcome the capillary pressure of the liquid metal bead at the nozzle to drive a rather continuous flow of liquid metal through the orifice, clearing the clogged nozzle. The air pressure can be pulsed to control the rate and amount of the liquid metal. In this and other embodiments, the jetted material resulting from the leaning process can be caught in a waste-catcher such as 120, which may be part of the larger apparatus.

Figure 4:
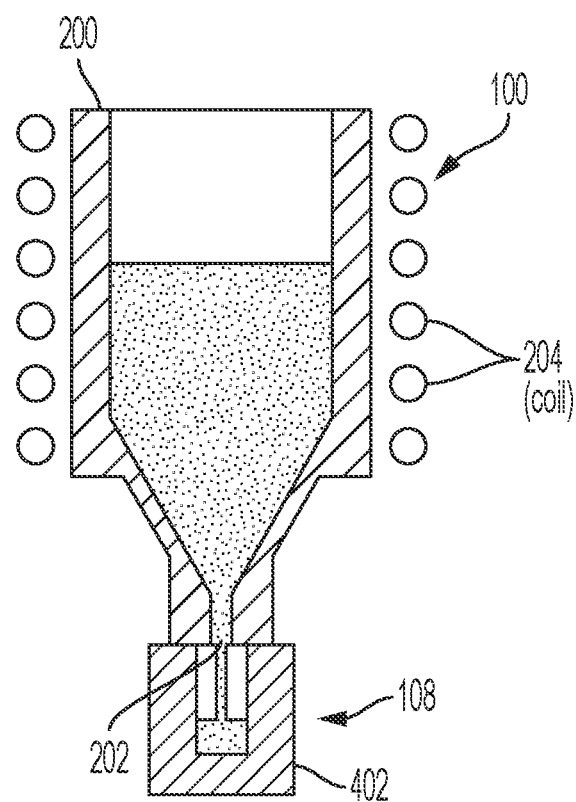

Alternatively, a vacuum can be applied to the nozzle end to draw the liquid metal through the nozzle, such as in FIG. 4. A vacuum line/hose 402 with an engagement mechanism can be constructed such that a sufficient seal is formed around the nozzle when engaged. The vacuum can also be pulsed to control the rate and amount of the liquid metal.

Figure 5:
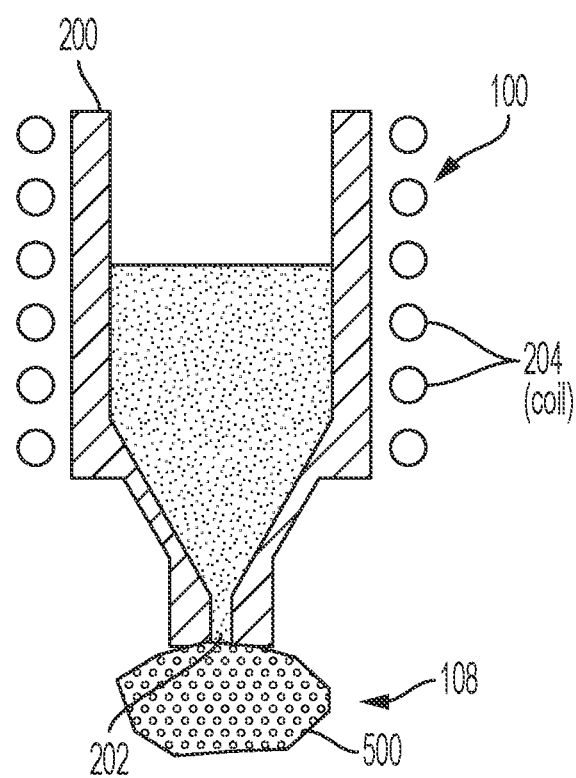

Alternatively, liquid flow driven by wetting action (wicking or capillary flow) can draw the liquid metal out of the nozzle, such as shown in FIG. 5. Examples include using wetting surfaces to touch the liquid metal meniscus at the nozzle opening. The wetting surface can be a solid surface (such as a metal rod or metal tube) that the liquid metal wets, or another liquid metal surface. In a preferred embodiment, the material 500 used to draw the liquid metal out of the nozzle has very high surface density, such as a porous material, a metallic sponge, a sintered block of metal, a mesh, a metallic fabric, etc. If the material is not readily wet by the liquid metal, a pre-treatment such as metallic vapor deposition can be used to pre-wet the porous material to enhance the wicking action. The porous/sponge-like materials can be used to wipe or touch the nozzle to perform the cleaning function.

Figure 6:
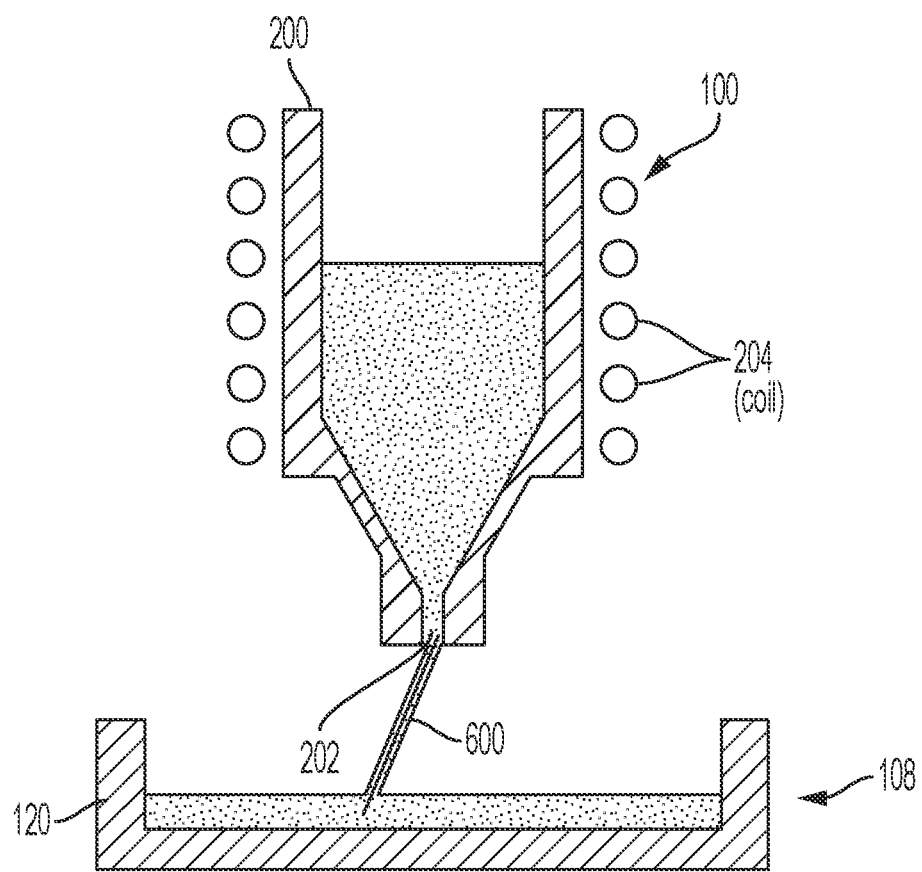

Another purging technique exploits gravity driven flow from the nozzle. The reason that the liquid metal is not flowing out of the nozzle is because of the capillary pressure created by the small meniscus of the bead around the nozzle. To create a gravity driven flow, the meniscus is broken by using a wetting surface to draw out the liquid metal and guide the metal to a larger pool/puddle/drop, such that gravity can then drive the flow in a sustainable fashion. For example, a thin metal wire 600, such as shown in FIG. 6, can be used to connect the meniscus at the nozzle to a pool of liquid metal. Initially, the liquid metal in the ejector will wet the wire and follow the wire to the pool. After that, gravity will take a dominant role to continuously drive the flow. Alternately, a large pool of liquid metal can be forced to touch the meniscus at the nozzle from below. The material flow could be out of the nozzle or into the nozzle depending on the nature of the clogging material.

Figure 7A:
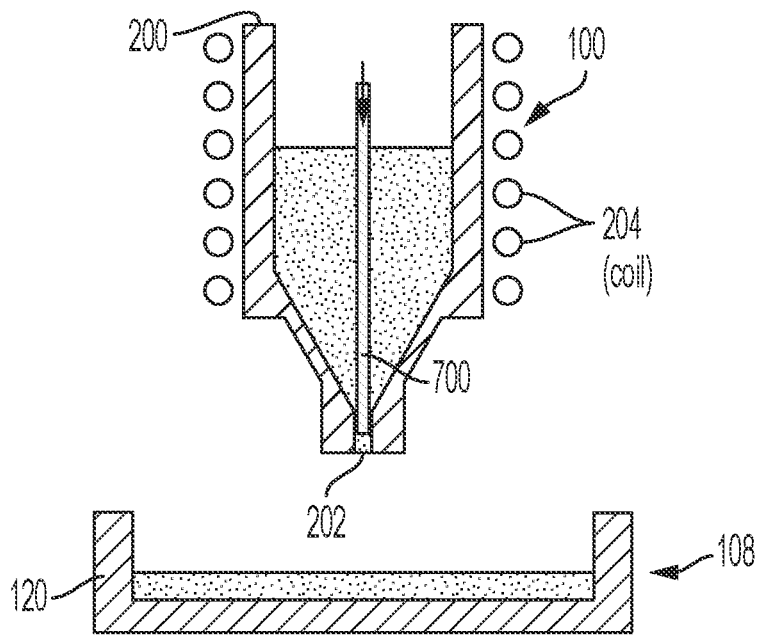
Figure 7B:
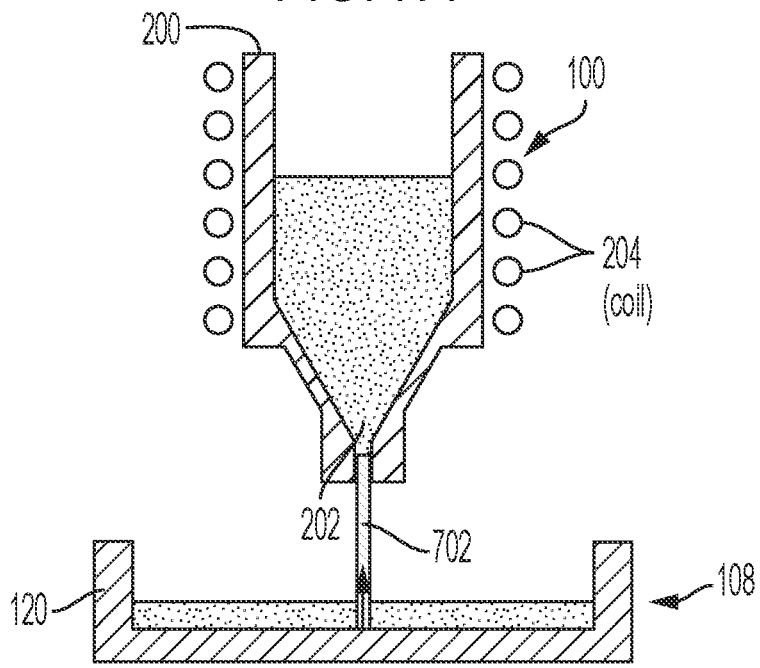

In another overall technique, the clogging material can be removed mechanically, using a physical device to dislodge the clogging material and remove it. For example, a needle, a pin, a wire or even a drill bit can be used to push through the nozzle in either direction to break loose the clogging material and remove it. A pin 700 can be installed inside the ejector, such as shown in FIG. 7A. Under normal jetting conditions, the pin is retracted and away from the nozzle to allow jetting. During the cleaning cycle, the pin 700 is extended to push through the nozzle. Alternately, in an external embodiment, a pin 702 is aligned with the nozzle, and pushes into and through the nozzle to loosen the clogging material, such as shown in FIG. 7B. Subsequent purging actions can then remove the clogging material.

Figure 8:
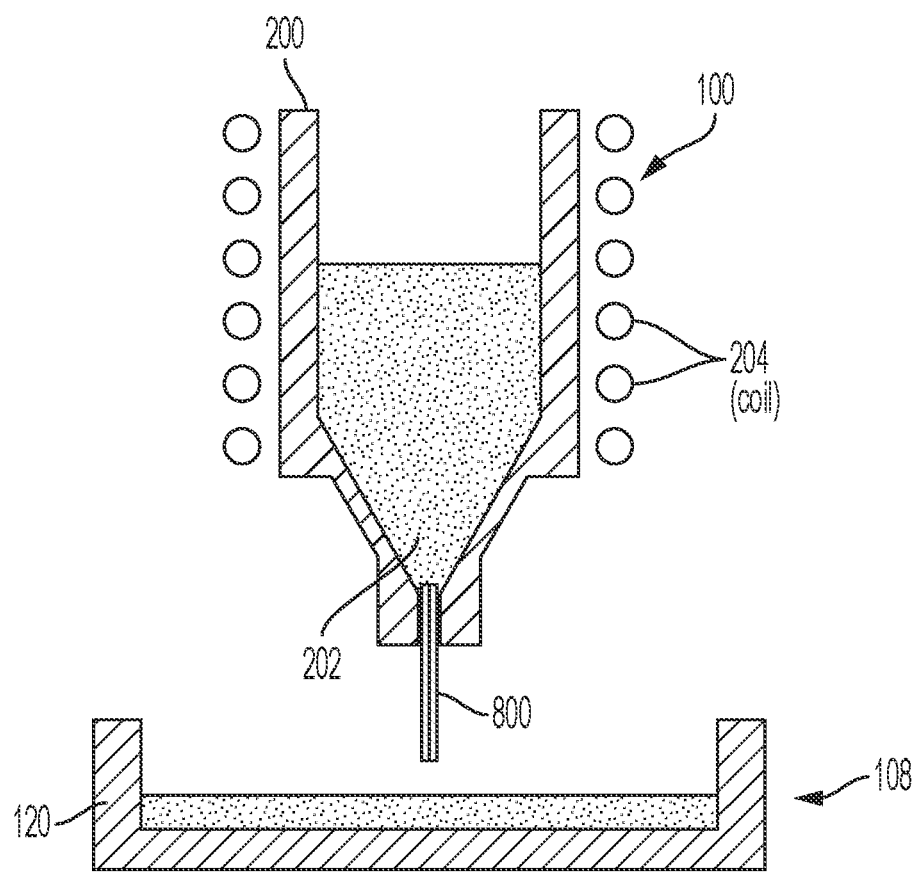

In another overall technique, the clogging material can be removed chemically, using selected chemicals/flux to chemically react with the clogging material. Depending on the nature of the clogging material, a selected flux can be used to chemically weaken or dissolve the clogging material. The flux can be brought into the nozzle channel by a pin or needle 800 from the nozzle end, such as shown in FIG. 8. After the reaction, the material can be expelled to a waste catcher using any of the methods described above. Liquid metal or salt and/or flux/other chemicals (such as strontium) to clean the nozzle face.

Figure 9:
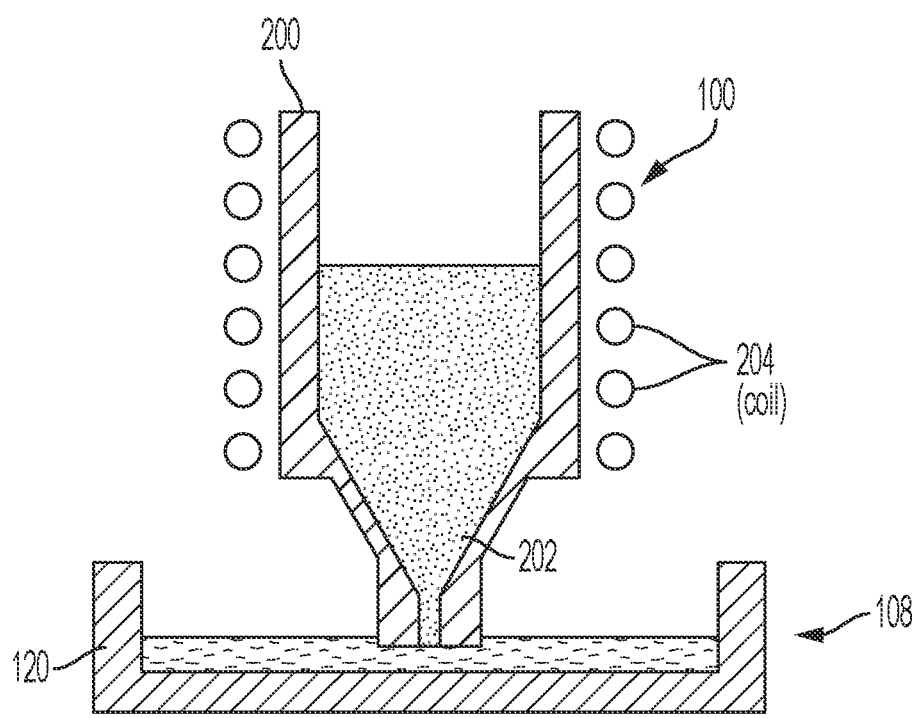

In another overall technique, the nozzle face and potentially the orifice edges can be cleaned by submerging the nozzle in a molten metal or salt loaded with flux or other chemicals, such as shown in FIG. 9. This material could be stagnant or flowing.

Figure 10:
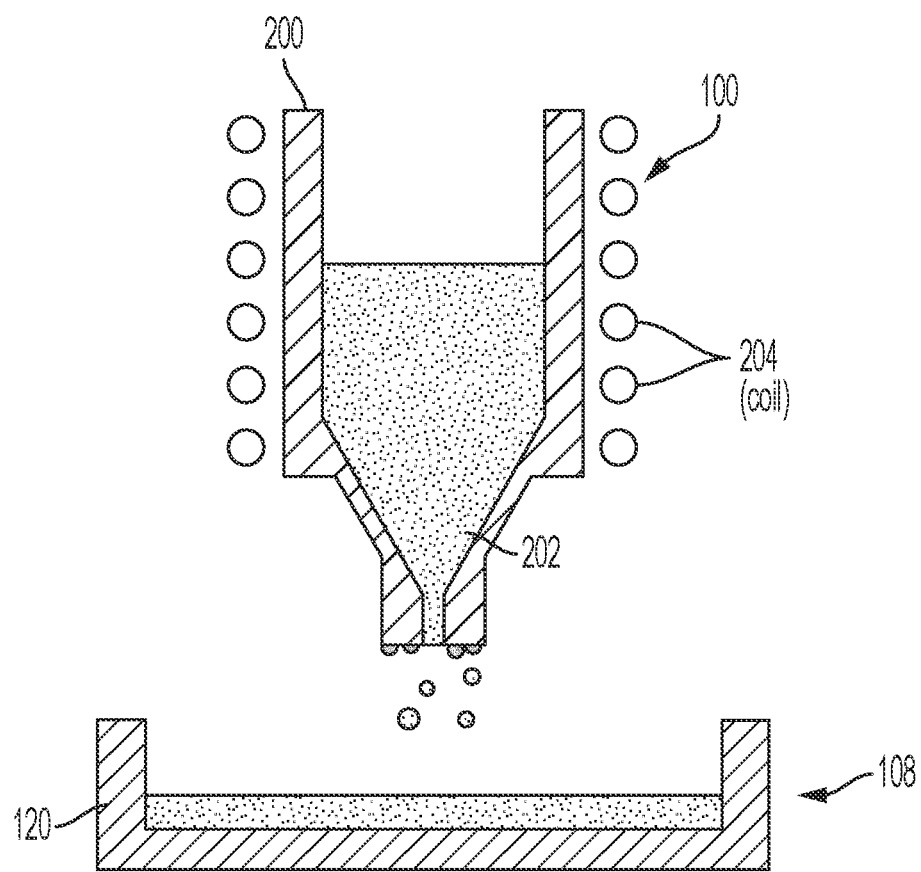

In one possible technique, ineffective (non-full-power) jetting can be used to cover the outside of the nozzle. By using electrical pulses of insufficient length or intensity to deposit drops, the front face of the nozzle can be flooded with metal. Material or flux can be added to the flooded material. The material can be wicked away after it has time to react with contamination such as oxides that may form on the front and inside the nozzle, such as shown in FIG. 10.

Depending on the nature of the clogging material, a selected flux can be used to chemically weaken or dissolve the clogging material. The material or flux can be brought into the nozzle channel by a pin or needle from the nozzle end; or it can be part of a mesh that is used to wick away the flooded material. For removing aluminum or magnesium oxide, for example, a mesh containing strontium may be used to chemically attract the oxygen away from the aluminum or magnesium allowing the metals to absorb into the liquid metal on the front of the nozzle.

Figure 11A:
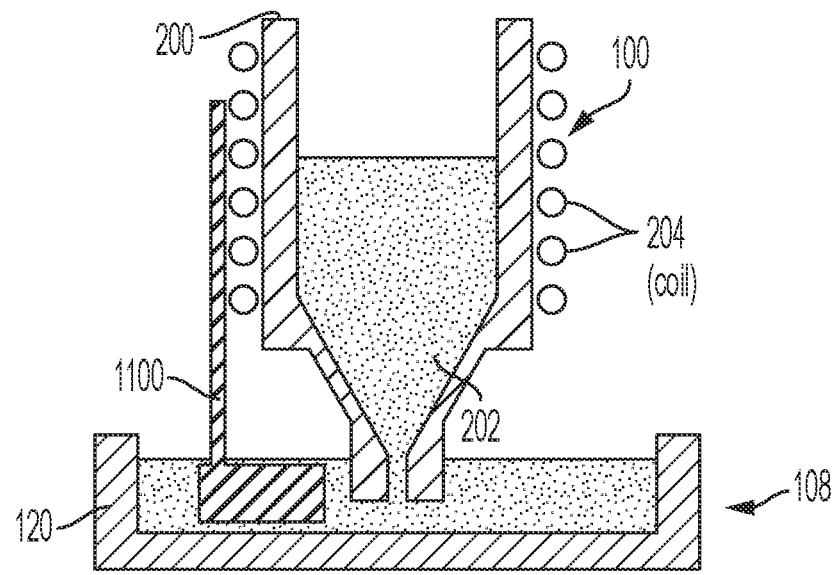
Figure 11B:
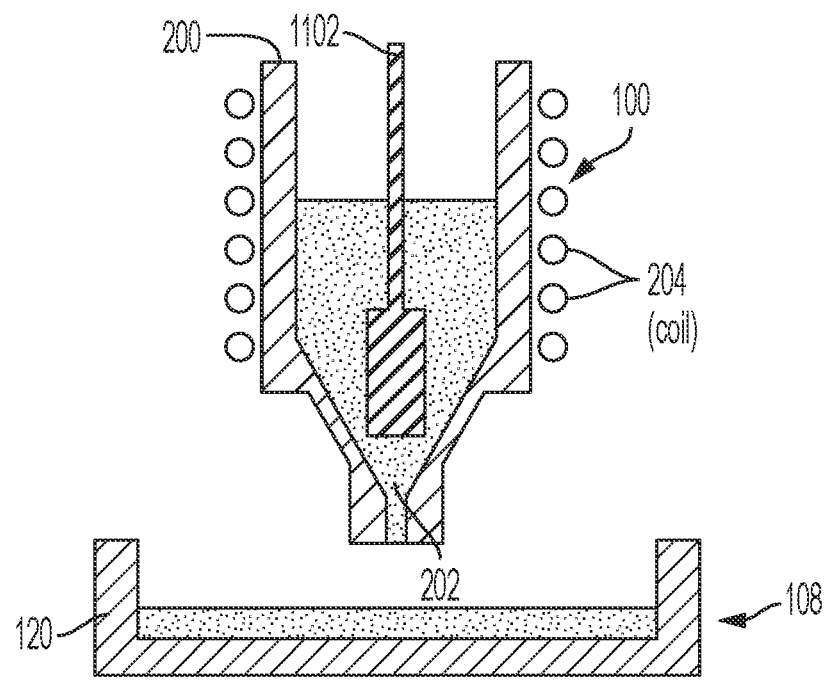

Another general technique that can be used is ultrasound cleaning. In external ultrasound cleaning, such as shown in FIG. 11A, the nozzle is submerged in molten metal which is ultrasonically agitated such as by an ultrasonic agitator 1100. The pressure waves will break up the solids accumulating in the nozzle which could be removed or jetted out over time. In interior ultrasonic cleaning, such as shown in FIG. 11B, an ultrasonic actuator 1102 is incorporated into the pump or positioned in the pump for cleaning operations. When activated, it breaks up accumulated solids in the pump.

Figure 12:
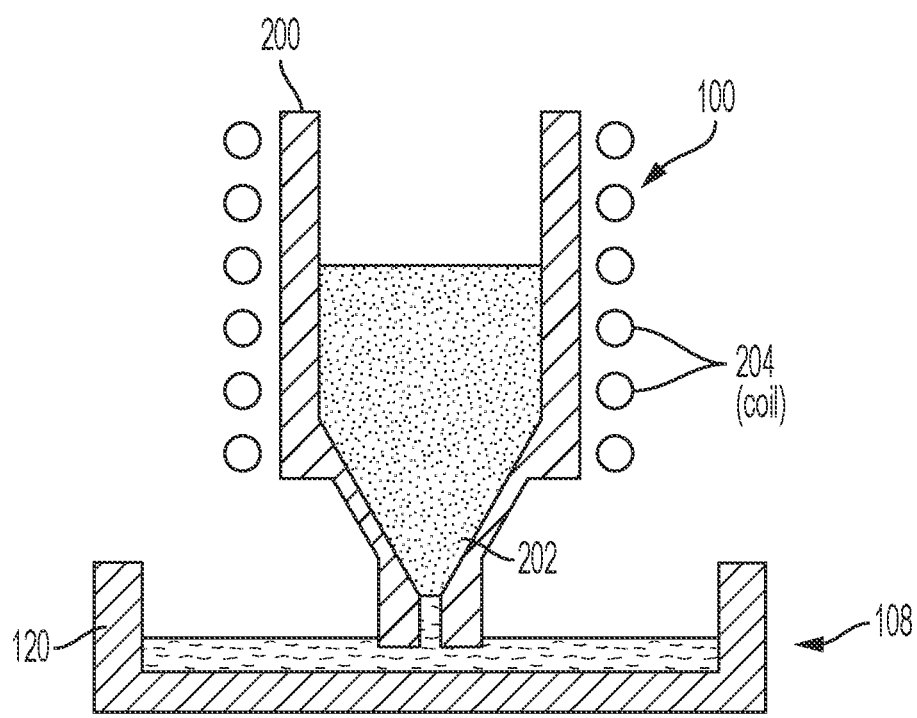

Another general technique that can be used is setting up reversed flow and/or oscillating flow within the nozzle. This technique can be combined with either a flow method or a chemical method, as described above. In this technique, liquids like molten metal, molten fluxes (salts) are forced into the nozzle from outside, such as shown in FIG. 12. These fluxes could be pulled back through the nozzle, allowed to mix with the metal inside the nozzle, or expected to float to the top of the pump in the case of fluxes which are less dense than aluminum.

Although MHD liquid metal jetting is shown as an example, the part building challenge is similar in other liquid metal jetting 3D printing technology where the droplets solidify quickly upon contact with the previously jetted and solidified drops. Therefore, the present disclosure applies to those technologies as well.

The invention claimed is:

1. A method of cleaning a nozzle, the nozzle ejecting liquid metal from a chamber through an opening, the chamber having associated therewith an electromagnetic actuator for causing liquid metal to be ejected from the chamber through the opening in the nozzle, the method comprising chemically removing a clogging material by operating a coil with electrical pulses that are insufficient to eject and deposit liquid metal drops on a workpiece to flood a face of the nozzle with liquid metal emitted from the nozzle and applying a strontium mesh to the liquid metal on the face of the nozzle to wick the clogging material from the face of the nozzle.

2. A method of cleaning a nozzle, the nozzle ejecting liquid metal from a chamber through an opening, the chamber having associated therewith an electromagnetic actuator for causing liquid metal to be ejected from the chamber through the opening in the nozzle, the method comprising chemically removing a clogging material from the nozzle by submerging the nozzle in a molten metal that contains a flux.

3. A method of cleaning a nozzle, the nozzle ejecting liquid metal from a chamber through an opening, the chamber having associated therewith an electromagnetic actuator for causing liquid metal to be ejected from the chamber through the opening in the nozzle, the method comprising chemically removing a clogging material by forcing a molten flux into the nozzle to contact the clogging material and pulling the molten flux back through the nozzle.

* * * * *